(12) United States Patent
Al Qizwini et al.

(10) Patent No.: US 11,655,028 B2
(45) Date of Patent: May 23, 2023

(54) REINFORCEMENT LEARNING BASED SYSTEM FOR AERIAL IMAGERY ACQUISITION USING DRONE FOLLOWING TARGET VEHICLE

(71) Applicant: General Motors LLC, Detroit, MI (US)

(72) Inventors: Mohammed H. Al Qizwini, Macomb, MI (US); David H. Clifford, Royal Oak, MI (US)

(73) Assignee: General Motors LLC, Detroit, MI (US)

( * ) Notice: Subject to any disclaimer, the term of this patent is extended or adjusted under 35 U.S.C. 154(b) by 478 days.

(21) Appl. No.: 16/794,407

(22) Filed: Feb. 19, 2020

(65) Prior Publication Data

US 2021/0256255 A1    Aug. 19, 2021

(51) Int. Cl.
```
G05D 1/12      (2006.01)
G06N 3/08      (2023.01)
G06V 20/10     (2022.01)
G05D 1/00      (2006.01)
G01S 19/43     (2010.01)
B64C 39/02     (2023.01)
G06T 7/73      (2017.01)
B64U 101/30    (2023.01)
```
(52) U.S. Cl.
CPC .......... *G06V 20/182* (2022.01); *B64C 39/024* (2013.01); *G01S 19/43* (2013.01); *G05D 1/0094* (2013.01); *G05D 1/12* (2013.01); *G06N 3/08* (2013.01); *G06T 7/74* (2017.01); *B64U 2101/30* (2023.01); *B64U 2201/104* (2023.01)

(58) Field of Classification Search
CPC ...... G06V 20/182; G06V 10/25; G06V 10/24; B64C 39/024; B64C 2201/123; B64C 2201/145; B64C 2201/127; G01S 19/43; G01S 19/15; G01S 19/51; G01S 19/42; G05D 1/0094; G05D 1/12; G06N 3/08; G06N 3/006; G06T 7/74; G08G 5/0021; G08G 5/0034; G08G 5/0039; G08G 5/0052; G08G 5/0069; G08G 5/0095; G01C 21/32
See application file for complete search history.

(56) References Cited

U.S. PATENT DOCUMENTS

| | | | |
|---|---|---|---|
| 9,056,676 B1* | 6/2015 | Wang | B60R 9/00 |
| 2014/0316616 A1* | 10/2014 | Kugelmass | G08G 5/0039 701/8 |
| 2021/0166402 A1* | 6/2021 | Ricco | G06N 3/006 |
| 2021/0240206 A1* | 8/2021 | Michini | G01C 15/02 |

OTHER PUBLICATIONS

U.S. Appl. No. 16/441,866, filed Jun. 14, 2019, Bulan et al.

\* cited by examiner

*Primary Examiner* — Peter D Nolan
*Assistant Examiner* — Ashley L Redhead, Jr.

(57) ABSTRACT

A method of surveying roads includes generating a dynamic flight plan for a drone using a vehicle traveling on a road as a target. The dynamic flight plan includes instructions for movement of the drone. The method includes controlling the drone as a function of position of the vehicle based on the dynamic flight plan. The method includes maintaining, based on the controlling, line of sight with the drone while the drone with an onboard camera follows the vehicle and captures images of the road being traveled by the vehicle using the onboard camera.

20 Claims, 5 Drawing Sheets

US 11,655,028 B2

REINFORCEMENT LEARNING BASED SYSTEM FOR AERIAL IMAGERY ACQUISITION USING DRONE FOLLOWING TARGET VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a reinforcement learning based system and method for aerial imagery acquisition using a drone following a target vehicle.

High definition maps enable autonomous vehicles to navigate by providing precise localization and pose estimation. High definition maps are obtained from aerial imagery captured by flying human-operated aircrafts and/or by driving mapping vehicles equipped with sensors such as cameras, RADAR, LiDAR, and so on. High definition maps include road features such as lane markings, lane widths, curvature information, and so on that enable autonomous navigation. The road features are extracted from the aerial imagery and/or the data collected by the mapping vehicles.

SUMMARY

A method of surveying roads comprises generating a dynamic flight plan for a drone using a vehicle traveling on a road as a target. The dynamic flight plan includes instructions for movement of the drone. The method comprises controlling the drone as a function of position of the vehicle based on the dynamic flight plan. The method comprises maintaining, based on the controlling, line of sight with the drone while the drone with an onboard camera follows the vehicle and captures images of the road being traveled by the vehicle using the onboard camera.

In another feature, the controlling includes controlling a relative position of the drone relative to the vehicle while the drone follows the vehicle.

In another feature, the controlling includes changing a velocity of the drone in a direction to maintain a relative distance of the drone from the vehicle in the direction while the drone follows the vehicle.

In another feature, the method further comprises capturing images of only relevant features of the road using the onboard camera based on the controlling.

In another feature, the method further comprises excluding capture of surroundings of the road based on the controlling.

In another feature, the method further comprises generating timestamped and georeferenced images of the road based on the images captured by the onboard camera.

In other features, the method further comprises storing data regarding positions of the vehicle and the drone and a relative position of the drone relative to the vehicle while the drone follows the vehicle, and aligning the images captured by the onboard camera of the drone with ground data.

In another feature, the controlling the drone as a function of position of the vehicle includes using reinforced learning.

In other features, the method further comprises determining a relative position of the drone relative to the vehicle using real-time kinematic positioning data of the vehicle and the drone obtained from a global positioning satellite system. The controlling includes controlling the relative position of the drone relative to the vehicle while the drone follows the vehicle.

In other features, the method further comprises generating a map based on the images captured by the onboard camera, and using the map for autonomous navigation of one or more vehicles.

In still other features, a system for surveying roads comprises a receiving module configured to receive a dynamic flight plan for a drone from a vehicle traveling on a road as a target. The dynamic flight plan includes instructions for movement of the drone. The system comprises a target tracking module configured to control the drone as a function of position of the vehicle based on the dynamic flight plan. The target tracking module is configured to maintain, based on the control, line of sight with the drone while the drone with an onboard camera follows the vehicle and captures images of the road being traveled by the vehicle using the onboard camera.

In another feature, the target tracking module is configured to control the drone by controlling a relative position of the drone relative to the vehicle while the drone follows the vehicle.

In another feature, the target tracking module is configured to control the drone by changing a velocity of the drone in a direction to maintain a relative distance of the drone from the vehicle in the direction while the drone follows the vehicle.

In another feature, the system further comprises an image capturing module configured to capture images of only relevant features of the road using the onboard camera based on the control of the drone by the target tracking module.

In another feature, the system further comprises an image capturing module configured to exclude capture of surroundings of the road based on the control of the drone by the target tracking module.

In another feature, the system further comprises an image capturing module configured to generate timestamped and georeferenced images of the road based on the images captured by the onboard camera.

In other features, the target tracking module is configured to store data regarding positions of the vehicle and the drone and a relative position of the drone relative to the vehicle while the drone follows the vehicle. The system further comprises an image capturing module configured to align the images captured by the onboard camera of the drone with ground data.

In another feature, the target tracking module is configured to control the drone as a function of position of the vehicle using reinforced learning.

In other features, the target tracking module is configured to determine a relative position of the drone relative to the vehicle using real-time kinematic positioning data of the vehicle and the drone obtained from a global positioning satellite system. The target tracking module is configured to control the relative position of the drone relative to the vehicle while the drone follows the vehicle.

In another feature, the system further comprises a computing system configured to receive the images captured by the onboard camera from the drone via a network, and generate a map based on the images captured by the onboard camera. The map is used for autonomous navigation of one or more vehicles.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
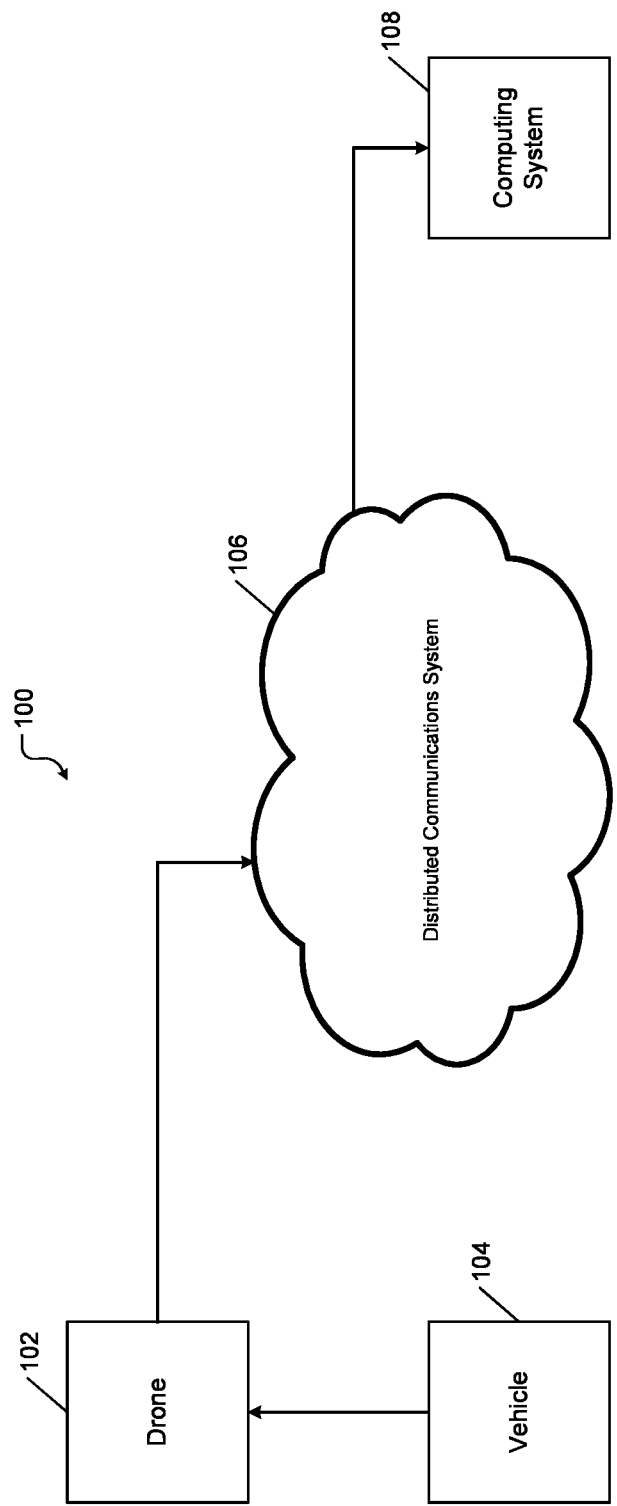
FIG. 1 shows a system for controlling a drone using a target vehicle according to the present disclosure.

Aerial imagery obtained using aircrafts lacks high resolution since the imagery is generated through human-operated planes at high altitude, which capture a lot of unwanted imagery surrounding the roads. Not only does the captured aerial imagery require significant cleanup but the aerial imagery also fails to capture the details (i.e., the road features) that are necessary for autonomous navigation. Alternatively, a mapping vehicle equipped with sensors such as cameras can be driven to capture the imagery. However, on-vehicle cameras can capture only portions of intersections. Further, the lane widths captured by the on-vehicle cameras are not accurate, and the road curvatures are cut-off.

In contrast, a drone equipped with cameras can follow a target vehicle at a much lower altitude than an aircraft. As a result, the imagery captured by the drone cameras is more relevant (i.e., focused on the road features) and is of high resolution. That is, the imagery that is captured by a drone following a target vehicle includes feature details that the on-vehicle cameras cannot accurately capture. Specifically, the drone cameras can observe an entire road cross-section, have the same perspective for all the lane features, and can capture the full road curvature. Further, since the drones fly at a much lower altitude than airplanes, the drones do not capture a lot of unwanted imagery surrounding the roads, which significantly reduces the amount of data processing required to extract features from the data captured by the drone cameras. Thus, drones can provide high resolution imagery at significantly reduced costs. However, drones require human operators to maintain line of sight and require flight plans or control signals for continuous operation.

The present disclosure provides a reinforcement learning (RL) based algorithm as an example of a control algorithm to control a drone's speed for the drone to follow a target vehicle. The present disclosure further provides methods to maintain line of sight to drones engaged in land survey and to coordinate observations of road relevant features with high precision. Specifically, the present disclosure provides an RL based algorithm to control a drone's velocity to follow a controlling vehicle, a method for generating dynamic flight plans for the drone, a system to maintain line of sight to the drone, methods to restrict the survey to relevant operational domains, and a system for aligning aerial and ground-based data collection.

The following are some of the novel aspects of the systems and methods provided by the present disclosure. The methods of the present disclosure for drone flight planning and survey of infrastructure are based on a static operator. Generation of flight plans for aerial survey is constructed by constraints of human operator and availability of airfields for takeoff and landing, not by presence of salient features in the region of interest. In contrast, according to the systems and methods of the present disclosure, use of a dynamic target (a ground vehicle) provides a flight plan during the course of operation of the drone and limits data collection to precise regions of interest, preventing the need for substantial post processing of the captured aerial imagery.

The present disclosure provides an ability to concatenate ground vehicle data with aerial imagery data on the time of flight during the day of survey, which enriches the capability to generate feature rich maps; limits the need to post-process and resolve structures from motion challenges; resolves occlusion, warping, horizon issues in ground-survey data; and provides richer 3-D localizer context for aerial images. Additionally, the present disclosure provides dynamic target control via GPS-over wireless communication, which enables simple target tracking for line of sight operation to comply with regulations. These and other novel features of the systems and methods of the present disclosure are described below in detail.

The present disclosure is organized as follows. Initially, the system and method for controlling the drone using a target vehicle are described. Subsequently, a system for controlling the drone using a target vehicle according to the present disclosure is shown and described with reference to FIG. 1. The relevant elements of the drone and vehicle are shown and described in further detail with reference to FIG. 2. A target tracking module of the drone is shown and described in detail with reference to FIG. 3. An example of a reinforcement learning module of the drone is shown and described in detail with reference to FIGS. 4 and 5. A method for controlling the drone using a target vehicle is broadly shown and described with reference to FIG. 6. The method is shown and described in further detail with reference to FIG. 7. A method of controlling the drone speed is shown and described with reference to FIG. 8. A method of aligning the images captured by the drone is shown and described with reference to FIG. 9. A method of generating maps at a remote computing system using the images is shown and described with reference to FIG. 10.

More specifically, a system according to the present disclosure includes a drone, a vehicle, and an algorithm that controls the drone. The system sends time stamped and georeferenced images collected from the drone and the vehicle. A back end computer system (e.g., in a cloud) associates the drone images with roadway images. The drone follows a vehicle on the road for the purpose of conducting aerial survey of the roads. The vehicle provides the flight plan for the drone. The algorithm allows the timestamped and georeferenced association to be conducted at a fine-grained level. The algorithm associates the position of the drone at any given point in time with the position of the vehicle at the same point in time, which allows the co-localization and the concatenation of the imagery from the aerial birds-eye view with the grounds-eye view. The algorithm allows the co-localization and concatenation to be performed with a high degree of fidelity and with a high level of confidence in the transformation. If the drone with a flight path is simply flown over a vehicle with a driving path, landmarks would be needed for the association. However, in the system of the present disclosure, since the drone is controlled by (i.e., based on) the position of the vehicle, the association can be performed without needing any landmarks. As explained below, the multi-axes distances between the drone and the vehicle and the yaw allow the algorithm to perform the concatenation with a high degree of confidence.

The algorithm uses two inputs: vehicle real time kinematic (RTK) data and drone GPS data. RTK positioning is a satellite navigation technique used to enhance the precision of position data derived from satellite-based positioning systems called global navigation satellite systems (GNSS) such as GPS. The RTK data is obtained from a GPS receiver on the vehicle. The vehicle GPS data can include errors due to interference from ground level noise. Data from an inertial measurement unit (IMU) in the vehicle is used to reduce the errors. The IMU is an electronic device that measures orientation, velocity, and gravitational forces using accelerometers and gyroscopes and often magnetometers. Since the drone flies higher than the ground, the drone GPS data has smaller errors than the errors in the vehicle GPS data due to lower levels of interference at the higher altitude than at the ground levels. Further, the drone also typically includes a six degree of freedom accelerometer that acts as the IMU on the drone.

The algorithm calculates the distances between the drone and the vehicle in 2.5D space based on the vehicle RTK data and the drone GPS data. The distances are denoted as Distance_x, Distance_y, and Distance_z. Note that the space is not full 3D space because while yaw is included in these calculations, pitch and roll of the drone are not considered in these calculations. (In navigation, an angular measurement on a horizontal plane relative to true north is called yaw (also called azimuth or heading); and an angular measurement on a vertical plane relative to a local level frame is generally computed as pitch or roll.)

For example, an RL based system such as a neural network is trained to control the speed of the drone (denoted as Speed_x, Speed_y, and Speed_z) based on these distances between the drone and the vehicle so as to maintain the relative position of the drone within a predetermined or desired range relative to the vehicle. For example, if Distance_x between the drone and the vehicle changes, the neural network can output a value for adjusting Speed_x of the drone; and so on.

An actor-critic neural network architecture is an example of a method for controlling the drone as a function of the target vehicle. Any other method that can control the relative position and movement of the drone as a function of the position and movement of the target vehicle can be used instead. Non-limiting examples of alternative algorithms include a fly-by-wire algorithm, a classical control architecture, and so on. The example architecture includes an actor and a critic that are jointly trained. The actor is given a target and makes a choice. The critic determines the appropriateness of the choice and scores the choice. The goal is to create an actor that achieves a score indicating convergence to a desired level.

The actor (i.e., the drone) receives an observation input, which is a position of the target vehicle, at each step in a time series and makes a choice about its next position as an output (i.e., given the position of the vehicle, what should be the next position of the drone). A neural network, which can include, for example, three layers of fully connected neurons, outputs x, y, and z velocities for the drone based on the received observation inputs indicating the target vehicle's position. The output velocities are to maintain the position of the drone within a desired range relative to the target vehicle.

The critic uses a neural network that receives the same observation inputs (i.e., the vehicle position) that the actor received and receives the outputs (i.e., the x, y, and z velocities) that the actor produced based on the observation inputs. The critic scores the actor's outputs (i.e., the velocity choices made by the actor based on the observation inputs) and outputs a score indicating the appropriateness of the actor's outputs. From the score, the actor learns to produce outputs such that the critic's score for the actor's outputs is as valuable as possible. The actor continues to learn (e.g., by adjusting weights of the neural network) until the actor produces optimal outputs, which is indicated by convergence or a particular desired score output by the critic. The critic is rewarded or penalized, for example, based on the x, y, and z distances between the drone and the target vehicle. For example, these distances may be selected based on the roads being mapped (e.g., downtown streets versus freeways, winding roads versus straight roads, and so on). Thus, the actor and critic use respective neural networks that are coupled together and that learn (i.e., train) jointly using reinforcement learning.

In sum, a dynamic flight plan for a drone is generated using a target vehicle. The flight plan is such as to survey only the roads and to avoid ancillary imagery surrounding the roads. The dynamic flight plan generated using the target vehicle meaningfully restricts the survey conducted using the drone to relevant operational domains. In one implementation, for example, an RL based algorithm is used to control the drone to follow the target vehicle, where the drone learns the flight path based on the position of the target vehicle at each step in time so that the drone faithfully follows or tracks the target vehicle. The coupling between the flight path of the drone and the movement of the target vehicle allows aligning the aerial and ground-based data. The alignment is possible because the algorithm stores, at each step of the survey process, the position of the vehicle, the position of the drone, and the relative position between the drone and the vehicle, due to which the imagery alignment can be made at a higher granular level of detail. Additionally, the system allows the operator to maintain line of sight to the drone as required by regulations.

Accordingly, the system and method according to the present disclosure include generating a dynamic flight plan for a drone using a human operated ground vehicle as target. The flight plan instructs the drone how to survey the roads by providing location and orientation instructions to the drone. The system and method provide a specific way of providing instructions to the drone by using the ground vehicle as target. The drone is controlled using the ground vehicle to restrict the survey conducted by the drone, where the control operationally limits the survey based on the criterion that the drone surveys only the roads and not ancillary imagery surrounding the roads. One example of using the ground vehicle as target (i.e., to control the drone to follow the ground vehicle) is using an RL algorithm. The RL algorithm is used for two reasons. First, it allows determining the drone position relative to the ground vehicle at a very granular level and provides a stable control policy that the drone should be within a particular relative position from the vehicle and that the drone should know its relative position to the vehicle at any given epoch of movement. This allows aligning the aerial and ground imagery in post processing. Second, the RL algorithm also allows maintaining strict distance control (i.e., line of sight) to the drone by incorporating the line of sight distance as part of the reward function of the control policy.

FIG. 1 shows a system 100 for controlling a drone using a target vehicle according to the present disclosure. The system 100 comprises a drone 102, a vehicle 104, a distributed communications system 106, and a computing system 108. The drone 102 is controlled as a function of the position of the vehicle 104 and follows or tracks the vehicle 104 as described below. The drone 102 captures only road relevant features using an on-board camera while following the vehicle 104. The drone 102 generates timestamped and georeferenced images of the roads traveled by the vehicle 104. The drone 102 transmits the timestamped and georeferenced images to the computing system 108 via the distributed communications system 106.

For example, the distributed communications system 106 may include but is not limited to a cellular network, a local and/or a wide area network, a satellite based communications network, and/or the Internet. For example, the computing system 108 may be located in a cloud and may include one or more computing devices such as servers comprising one or more processors, memory, network interfaces, and so on. The computing system 108 extracts the road features from the timestamped and georeferenced images received from the drone 102 and generates maps for use in autonomous navigation, for example.

Figure 2:
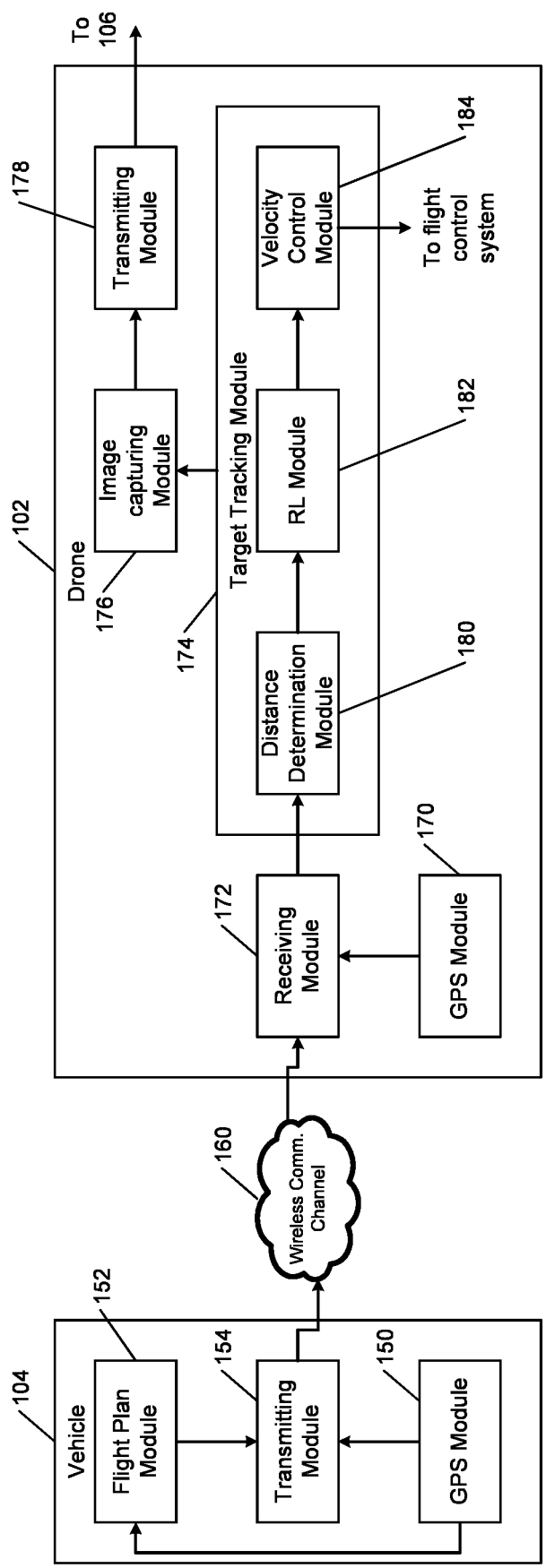
FIG. 2 shows the relevant elements of the drone and the target vehicle in further detail.

FIG. 2 shows relevant elements of the drone 102 and the vehicle 104 in further detail. For example, the vehicle 104 includes a GPS module 150, a flight plan module 152, and a transmitting module 154. While not shown, it is understood that the vehicle 104 also includes a receiving module. For example, the receiving module may be a portion of a transceiver that also includes the transmitting module 154. Further, while not shown, the vehicle 104 includes suitable antenna or antennas for communicating with GPS satellites and the drone 102.

The GPS module 150 provides the positioning data of the vehicle 104. The positioning data may be corrected by an IMU module (not shown). For example, the positioning data may include RTK data. The flight plan module 152 dynamically generates a flight plan for the drone 102 to follow the vehicle 104. For example, the flight plan includes instructions for the drone 102 indicating what should be the location and orientation of the drone 102 to survey the roads traveled by the vehicle 104. The flight plan is dynamically updated so that the drone 102 can follow or track the vehicle 104 as explained below. The transmitting module 154 transmits the positioning data of the vehicle 104 and the flight plan to the drone 102 via a wireless communication channel 160. For example, the wireless communication channel 160 may include a cellular network accessible by the drone 102 and the vehicle 104.

The drone 102 comprises a GPS module 170, a receiving module 172, a target tracking module 174, an image capturing module 176, and a transmitting module 178. While shown separately, the receiving module 172 and the transmitting module 178 may be integrated into a single transceiver. Further, while not shown, the receiving module 172 and the transmitting module 178 may communicate with the wireless communication channel 160 and the distributed communications system 106 via suitable antenna or antennas included in the drone 102.

The GPS module 170 provides positioning data of the drone 102 to the receiving module 172. The receiving module 172 receives the positioning data of the vehicle 104 and the flight plan from the vehicle 104. The receiving module 172 outputs the positioning data of the vehicle 104 and the drone 102 and the flight plan to the target tracking module 174.

The target tracking module 174 comprises a distance determination module 180, a reinforcement learning (RL) module 182, and a velocity control module 184. The distance determination module 180 determines a distance (i.e., a relative position in 3 dimensions, see FIG. 3) of the drone 102 from the vehicle 104 based on the positioning data of the vehicle 104 and the drone 102. As described below in detail, the RL module 182 determines changes to be made to the velocity of the drone 102 (in 3 dimensions, see FIG. 3) based on the distance between the drone 102 and the vehicle 104 (i.e., the relative position of the drone 102 relative to the vehicle 104 in 3 dimensions). The RL module 182 outputs the changes to the velocity or simply the updated velocity for the drone 102 (in 3 dimensions) to the velocity control module 184. The velocity control module 184 controls the velocity of the drone 102 (in 3 dimensions) based on the output of the RL module 182. The velocity control module 184 controls a flight control system (e.g., motors, propellers, and other components; all not shown) of the drone 102 based on the output of the RL module 182. The image capturing module 176 captures images using a camera (not shown) while the drone 102 follows the vehicle 104 under the control of the target tracking module 174.

Figure 3:
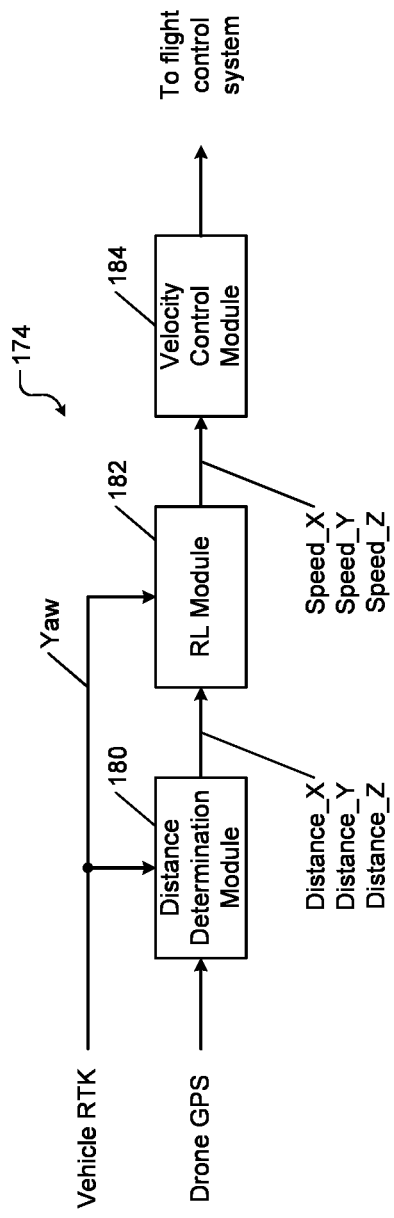
FIG. 3 shows inputs and outputs of a target tracking module of the drone in further detail.

FIG. 3 shows the inputs and outputs of each element of the target tracking module 174. For example, the distance determination module 180 receives the RTK data of the vehicle 104 and the positioning data of the drone 102. The distance determination module 180 outputs Distance_x, Distance_y, and Distance_y of the drone 102 relative to the vehicle 104. The RL module 182 receives the RTK data of the vehicle and the distances along the x, y, and z axes between the drone 102 and the vehicle 104 (i.e., the relative position of the drone 102 relative to the vehicle 104). The RL module 182 outputs the changes to the velocities or simply the updated velocities Speed_x, Speed_y, and Speed_z for the drone 102. The velocity control module 184 controls the flight control system of the drone 102 based on the output of the RL module 182.

Figure 4:
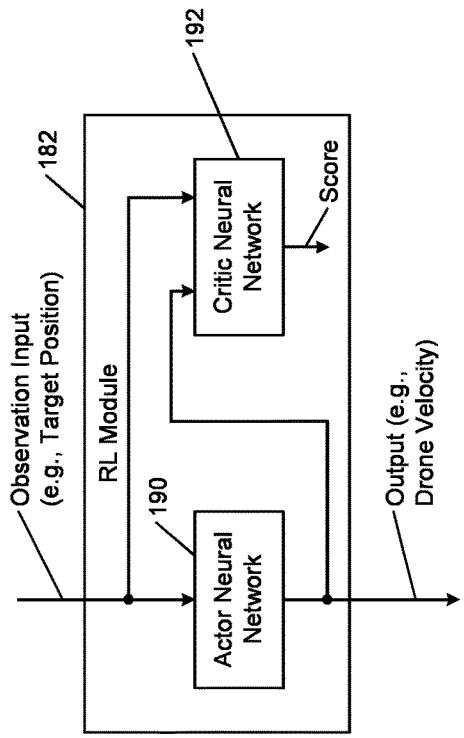
FIG. 4 shows an example of a reinforcement learning (RL) module of the drone.

FIG. 4 shows an example of the RL module 182 in further detail. For example, the RL module 182 may comprise an actor-critic neural network shown as an actor neural network 190 and a critic neural network 192. The actor neural network 190 receives observation inputs for the drone 102. The observation inputs include the position of the target, which is the vehicle 104. Based on the observation inputs, the actor neural network 190 determines actions that the actor, which is the drone 102, should take to follow the target, which is the vehicle 104. For example, the actions include x, y, and z velocities of the drone 102 as a function of the position of the vehicle 104.

The critic neural network 192 receives the same observation inputs that the actor neural network 190 receives. The critic neural network 192 also receives the actions determined by the actor neural network 190, which are to be taken by the actor (i.e., the drone 102) based on the observation inputs. The critic neural network 192 determines a score that indicates the appropriateness of the actions determined by the actor neural network 190.

The actor neural network 190 refines its actions based on the score. That is, from the score, the actor neural network 190 learns to produce outputs (i.e., x, y, z, velocities) such that the critic's score for the actor's outputs is as valuable as possible. The actor neural network 190 continues to learn (e.g., by adjusting weights of the actor neural network 190) until the actor neural network 190 produces optimal outputs (i.e., x, y, z, velocities), which is indicated by convergence or a particular desired score output by the critic neural network 192. The critic neural network 192 is rewarded or penalized, for example, based on the x, y, and z distances between the drone 102 and the vehicle 104. Thus, the actor neural network 190 and the critic neural network 192 are coupled together and learn (i.e., train) jointly using reinforcement learning.

Figure 5:
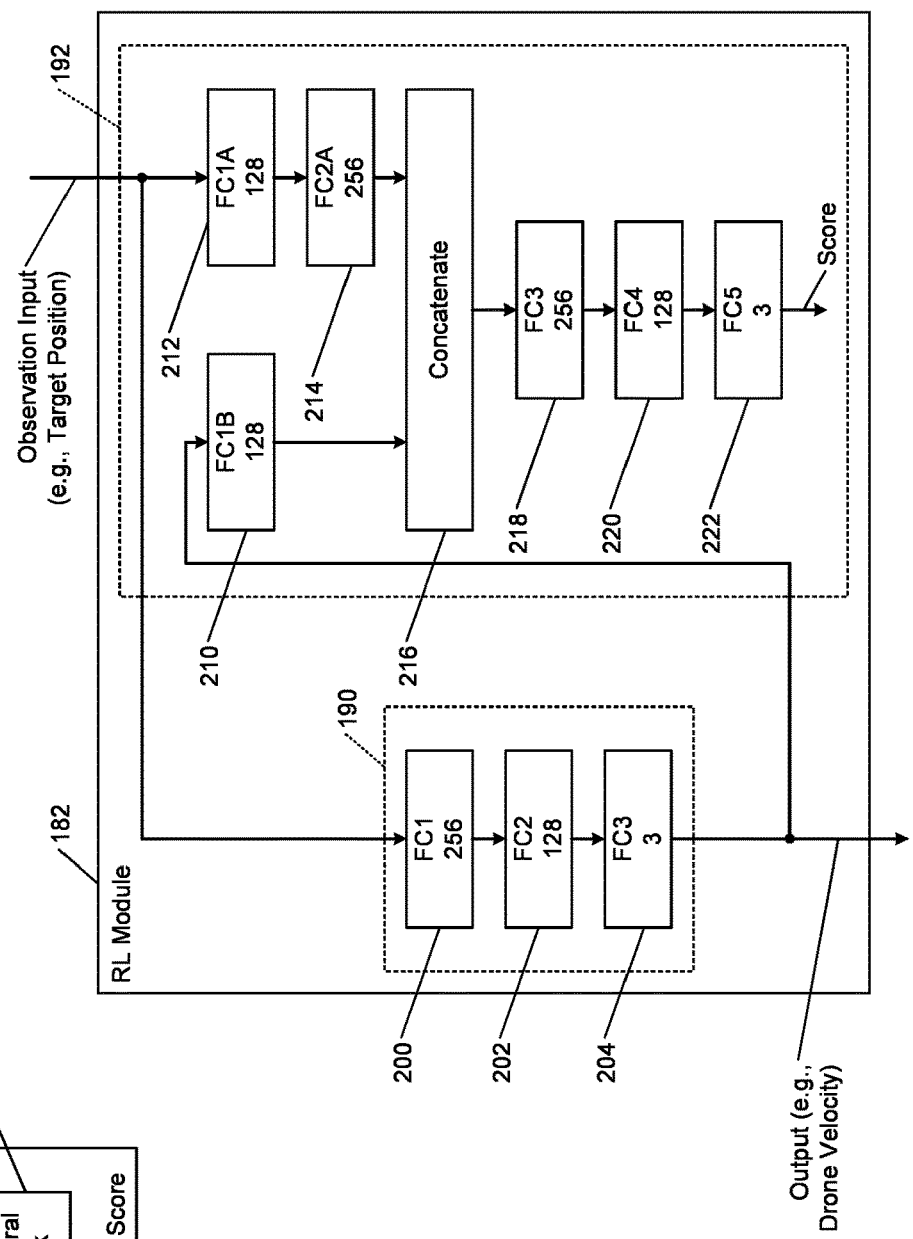
FIG. 5 shows an example of the of the RL module in further detail.

FIG. 5 shows an example of the of the RL module 182 in further detail. The number of layers and the number of neurons are shown for example only, and other configurations may be used instead. For example only, the actor neural network 190 comprises a 3-layer neural network of fully connected (FC) neurons shown as FC1 200, FC2 202, and FC3 204. For example only, the first layer FC1 200 includes 256 fully connected neurons, the second layer FC2 202 includes 128 fully connected neurons, and the third layer FC3 204 includes 3 fully connected neurons. The first layer FC1 200 receives the observation inputs (i.e., the position of the target, which is the vehicle 104). The third layer FC3 204 outputs the actions determined by the actor neural network 190 (i.e., x, y, z, velocities for the actor, which is the drone 102) based on observation inputs received.

For example only, the critic neural network 192 comprises two input branches. For example only, a first branch includes a single layer of fully connected neurons FC1B 210 including 128 fully connected neurons. The first branch of the critic neural network 192 receives the outputs of (i.e., actions determined by) the actor neural network 190 (i.e., x, y, z, velocities for the actor, which is the drone 102) based on observation inputs received by the actor neural network 190 as inputs.

For example only, a second branch includes two layers of fully connected neurons: For example, a first layer FC1A 212 including 128 fully connected neurons; and a second layer FC2A 214 including 256 fully connected neurons. The second branch receives the same observation inputs (i.e., the position of the target, which is the vehicle 104) that the actor neural network 190 receives. The outputs of the first and second branches are concatenated at 216.

The concatenated outputs are fed to third, fourth, and fifth layers of fully connected (FC) neurons shown as FC3 218, FC4 220, and FC5 222. For example only, the third layer FC3 218 includes 256 fully connected neurons, the fourth layer FC4 220 includes 128 fully connected neurons, and the fifth layer FC5 222 includes 3 fully connected neurons. The third layer FC3 218 receives the concatenated outputs, and the fifth layer FC5 222 outputs the scores of the critic neural network 192, which are described above and therefore are not described again for brevity.

Figure 6:
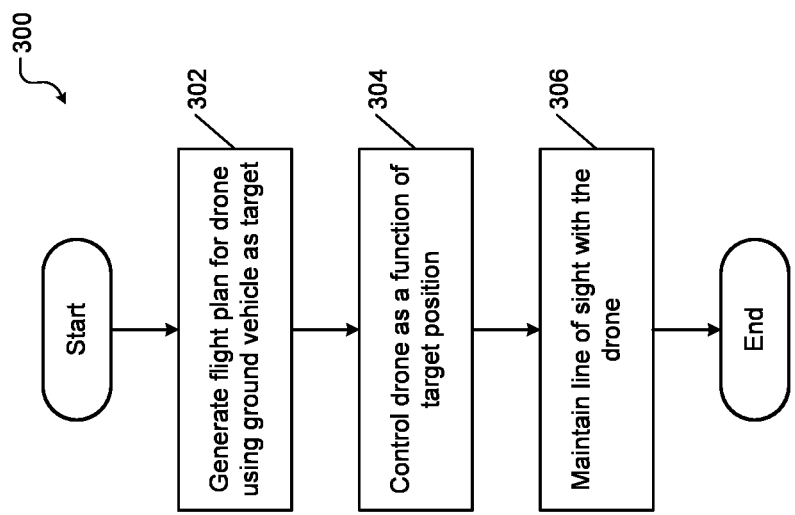
FIG. 6 shows a method used by the system of FIG. 1 for controlling the drone using the target vehicle according to the present disclosure.

FIG. 6 shows a method 300 for controlling a drone using a target vehicle according to the present disclosure. At 302, the method 300 generates a flight plan for the drone using a ground vehicle as a target. At 304, the method 300 controls the drone as a function of the position of the target. At 306, the method 300 maintains line of sight with the drone while the drone surveys the roads traveled by the target vehicle.

Figure 7:
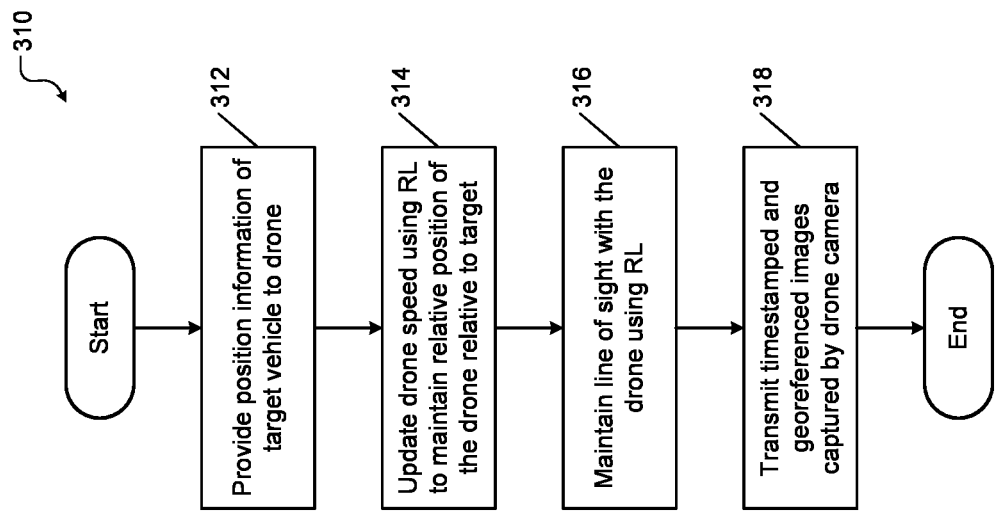
FIG. 7 shows the method of FIG. 6 in further detail.

FIG. 7 shows a method 310, which shows the method 300 in further detail, according to the present disclosure. At 312, the method 310 provides position information of the target vehicle to the drone. At 314, the method 310 updates the drone's velocities using reinforcement learning to maintain the relative position of the drone relative to the target vehicle. At 316, using reinforcement learning, the method 310 maintains line of sight with the drone while the drone surveys the roads traveled by the target vehicle. At 318, based on the data captured by a camera on-board the drone, the method 310 generates and transmits timestamped and georeferenced images including only road relevant features to a remote computing system, which generates maps based on the images.

Figure 8:
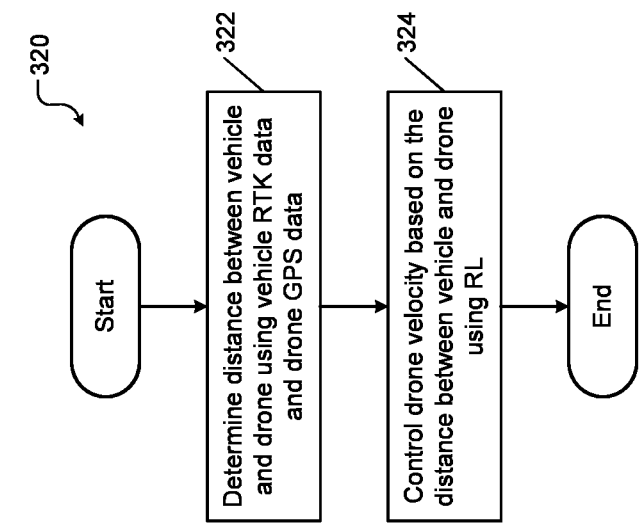
FIG. 8 shows a method for controlling the drone velocity according to the present disclosure in further detail.

FIG. 8 shows a method 320 for controlling the drone velocities according to the present disclosure in further detail. At 322, the method 320 determines the distances between the vehicle and the drone using vehicle RTK data and drone GPS data as described above in detail. At 324, the method 320 controls the drone velocities based on the distances using reinforcement learning as described above in detail.

Figure 9:
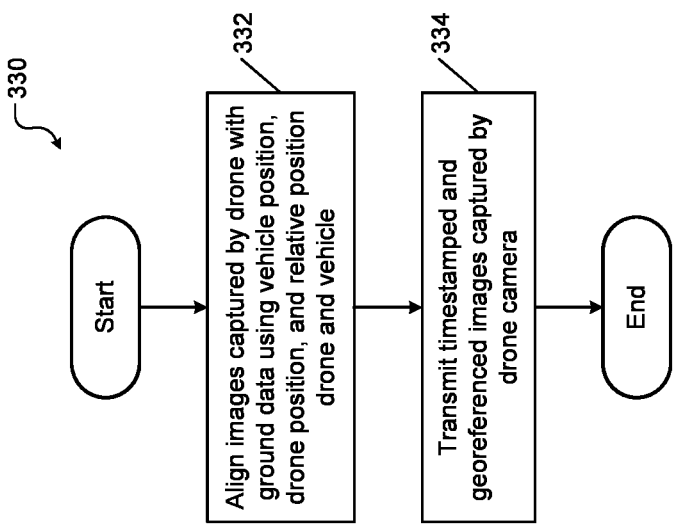
FIG. 9 shows a method for generating images based on the data captured by the drone by following the target vehicle according to the present disclosure.

FIG. 9 shows a method 330 for generating images based on the data captured by the drone by following the target vehicle according to the present disclosure. At 332, the method 330 aligns the images captured by the drone with the ground data using the vehicle position, the drone position, and the relative position of the drone relative to the vehicle stored at each step of the survey conducted by the drone by following the vehicle. At 334, the method 330 transmits the timestamped and georeferenced images captured by the drone including only road relevant features to a remote computing system, which generates maps based on the images.

Figure 10:
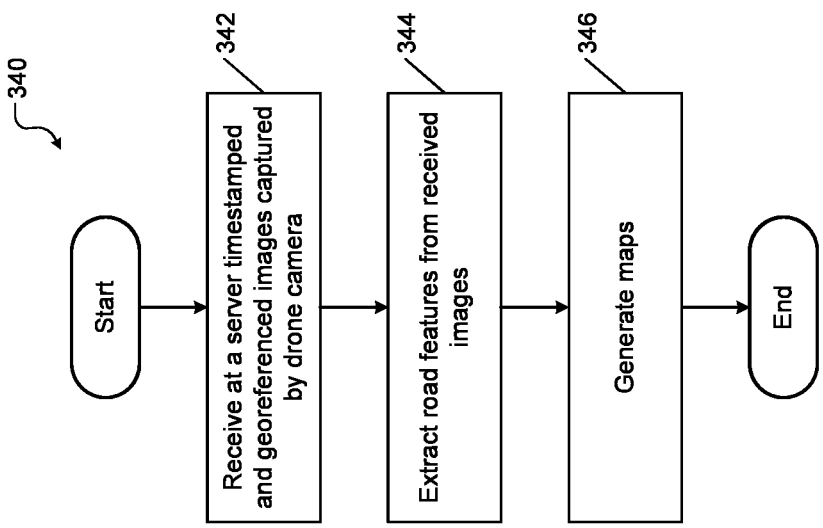
FIG. 10 shows a method of generating maps at a remote computing system based on images captured by the drone following a target vehicle according to the present disclosure.

FIG. 10 shows a method 340 of generating maps at a remote computing system based on images captured by the drone following a target vehicle according to the present disclosure. At 342, the method 340 receives the timestamped and georeferenced images captured by the drone including only road relevant features at the remote computing system. At 344, the method 340 extracts the road features from the received images. At 346, the method 340 generates maps based on the extracted features for use in autonomous navigation, for example.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method of surveying roads comprising:
generating a dynamic flight plan for a drone using a vehicle traveling on a road as a target, wherein the dynamic flight plan includes instructions for movement of the drone;
controlling the drone as a function of position of the vehicle based on the dynamic flight plan, wherein the controlling the drone as a function of position of the vehicle includes using reinforced learning;
maintaining, based on the controlling, line of sight with the drone while the drone with an onboard camera follows the vehicle and captures images of the road being traveled by the vehicle using the onboard camera; and using the reinforced learning, determining a position of the drone relative to the vehicle at a granular level and providing a control policy that the drone be within a particular relative position from the vehicle and that the drone maintains the position relative to the vehicle at any given epoch of movement for subsequently aligning aerial imagery captured by the drone with ground imagery.

2. The method of claim 1 wherein the controlling includes controlling a relative position of the drone relative to the vehicle while the drone follows the vehicle.

3. The method of claim 1 wherein the controlling includes changing a velocity of the drone in a direction to maintain a relative distance of the drone from the vehicle in the direction while the drone follows the vehicle.

4. The method of claim 1 further comprising capturing images of only relevant features of the road using the onboard camera based on the controlling.

5. The method of claim 1 further comprising excluding capture of surroundings of the road based on the controlling.

6. The method of claim 1 further comprising generating timestamped and georeferenced images of the road based on the images captured by the onboard camera.

7. The method of claim 1 further comprising:
storing data regarding positions of the vehicle and the drone and a relative position of the drone relative to the vehicle while the drone follows the vehicle; and
aligning the images captured by the onboard camera of the drone with ground data.

8. The method of claim 1 further comprising:
determining a relative position of the drone relative to the vehicle using real-time kinematic positioning data of the vehicle and the drone obtained from a global positioning satellite system,
wherein the controlling includes controlling the relative position of the drone relative to the vehicle while the drone follows the vehicle.

9. The method of claim 1 further comprising:
generating a map based on the images captured by the onboard camera; and
using the map for autonomous navigation of one or more vehicles.

10. The method of claim 1 further comprising, using the reinforced learning, controlling the line of sign to the drone by incorporating a line of sight distance as part of a reward function of the control policy.

11. A system for surveying roads comprising:
a receiving module configured to receive a dynamic flight plan for a drone from a vehicle traveling on a road as a target, wherein the dynamic flight plan includes instructions for movement of the drone; and
a target tracking module configured to:
control the drone as a function of position of the vehicle based on the dynamic flight plan, wherein the target tracking module is configured to control the drone as a function of position of the vehicle using reinforced learning;
maintain, based on the control, line of sight with the drone while the drone with an onboard camera follows the vehicle and captures images of the road being traveled by the vehicle using the onboard camera; and
using the reinforced learning, determine a position of the drone relative to the vehicle at a granular level and provide a control policy that the drone be within a particular relative position from the vehicle and that the drone maintains the position relative to the vehicle at any given epoch of movement for subsequently aligning aerial imagery captured by the drone with ground imagery.

12. The system of claim 11 wherein the target tracking module is configured to control the drone by controlling a relative position of the drone relative to the vehicle while the drone follows the vehicle.

13. The system of claim 11 wherein the target tracking module is configured to control the drone by changing a velocity of the drone in a direction to maintain a relative distance of the drone from the vehicle in the direction while the drone follows the vehicle.

14. The system of claim 11 further comprising an image capturing module configured to capture images of only relevant features of the road using the onboard camera based on the control of the drone by the target tracking module.

15. The system of claim 11 further comprising an image capturing module configured to exclude capture of surroundings of the road based on the control of the drone by the target tracking module.

16. The system of claim 11 further comprising an image capturing module configured to generate timestamped and georeferenced images of the road based on the images captured by the onboard camera.

17. The system of claim 11 wherein the target tracking module is configured to:
store data regarding positions of the vehicle and the drone and a relative position of the drone relative to the vehicle while the drone follows the vehicle; and
wherein the system further comprises:
an image capturing module configured to align the images captured by the onboard camera of the drone with ground data.

18. The system of claim 11 wherein the target tracking module is configured to:
determine a relative position of the drone relative to the vehicle using real-time kinematic positioning data of the vehicle and the drone obtained from a global positioning satellite system; and
control the relative position of the drone relative to the vehicle while the drone follows the vehicle.

19. The system of claim 11 further comprising a computing system configured to:
receive the images captured by the onboard camera from the drone via a network; and
generate a map based on the images captured by the onboard camera,
wherein the map is used for autonomous navigation of one or more vehicles.

20. The system of claim 11, wherein the target tracking module configured to, using the reinforced learning, control the line of sign to the drone by incorporating a line of sight distance as part of a reward function of the control policy.

* * * * *